United States Patent
Brennan et al.

(10) Patent No.: US 9,998,853 B2
(45) Date of Patent: Jun. 12, 2018

(54) DYNAMICALLY MANAGING A LISTEN LIST OF BEACON AWARE DEVICES

(71) Applicant: Microsoft Technology Licensing, LLC, Redmond, WA (US)

(72) Inventors: David J. Brennan, Redmond, WA (US); David Michael Gray, Bellevue, WA (US); Hubert Van Hoof, Seattle, WA (US); Nicholas Wrem, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 15/089,327

(22) Filed: Apr. 1, 2016

(65) Prior Publication Data
US 2017/0289749 A1    Oct. 5, 2017

(51) Int. Cl.
| | |
|---|---|
| H04W 4/02 | (2018.01) |
| H04W 4/04 | (2009.01) |
| H04W 40/24 | (2009.01) |
| H04W 4/00 | (2018.01) |
| H04W 64/00 | (2009.01) |

(52) U.S. Cl.
CPC ............ *H04W 4/02* (2013.01); *H04W 4/008* (2013.01); *H04W 4/04* (2013.01); *H04W 40/244* (2013.01); *H04W 64/00* (2013.01)

(58) Field of Classification Search
CPC .............................. H04W 4/008; H04W 4/021
USPC ......... 455/411, 456.1, 456.3, 416, 574, 41.2, 455/414.1, 456.2, 434, 432.1; 370/329, 370/337; 705/14.58, 26.8
See application file for complete search history.

(56) References Cited

U.S. PATENT DOCUMENTS

| | | | |
|---|---|---|---|
| 7,098,787 B2 | 8/2006 | Miller | |
| 7,751,829 B2 | 7/2010 | Masuoka et al. | |
| 8,040,219 B2 | 10/2011 | Haartsen et al. | |
| 8,618,984 B2 | 12/2013 | Lin et al. | |
| 8,744,750 B2 | 6/2014 | Gupta et al. | |
| 8,847,754 B2 | 9/2014 | Buchheim et al. | |
| 9,195,765 B2 | 11/2015 | Russell et al. | |
| 9,202,245 B2 | 12/2015 | Kostka et al. | |
| 2002/0176388 A1 | 11/2002 | Rankin et al. | |
| 2003/0119504 A1 | 6/2003 | Rankin | |

(Continued)

FOREIGN PATENT DOCUMENTS

| | | |
|---|---|---|
| AU | 2012101222 A4 | 9/2012 |
| WO | 2015049660 A1 | 4/2015 |

(Continued)

OTHER PUBLICATIONS

"iBeacon for the Enterprise: Facilitating a Rich Productive Workplace", Published Date: Feb. 1, 2015 Available at: http://apsima.com/blog/ibeacon-for-the-enterprise/.

(Continued)

*Primary Examiner* — Kiet M Doan
(74) *Attorney, Agent, or Firm* — Holzer Patel Drennan

(57) ABSTRACT

The described technology provides a system and method for dynamically managing a listen list for beacon aware devices. A mobile device may be configured to listen for one or more beacon UUIDs based on a listen list. A contextual change detected by the mobile device may trigger a collection of additional contextual information and update to the listen list based on the additional contextual information. Using the described technology, the mobile device may use a limited set of beacon UUIDs to improve micro-location granularity and enhance the mobile device's resources.

20 Claims, 7 Drawing Sheets

(56) References Cited

U.S. PATENT DOCUMENTS

| | | | |
|---|---|---|---|
| 2006/0287813 | A1 | 12/2006 | Quigley |
| 2008/0280624 | A1 | 11/2008 | Wrappe |
| 2010/0013704 | A1 | 1/2010 | Coutel et al. |
| 2012/0115512 | A1 | 5/2012 | Grainger et al. |
| 2013/0064142 | A1 | 3/2013 | Bhow |
| 2014/0364100 | A1 | 12/2014 | Marti et al. |
| 2015/0031388 | A1 | 1/2015 | Chatterjee et al. |
| 2015/0110259 | A1 | 4/2015 | Kaye et al. |
| 2015/0111552 | A1 | 4/2015 | Kaye et al. |
| 2015/0133173 | A1 | 5/2015 | Edge et al. |
| 2015/0181371 | A1 | 6/2015 | Steiner |
| 2015/0278867 | A1 | 10/2015 | Lerman et al. |
| 2015/0289207 | A1 | 10/2015 | Kubo et al. |
| 2015/0365486 | A1* | 12/2015 | Kotecha .................. H04L 67/18 455/414.1 |
| 2016/0100282 | A1* | 4/2016 | Pounds ................. H04W 4/008 455/456.1 |
| 2016/0148164 | A1* | 5/2016 | Luk .................... G06Q 10/1095 705/7.19 |
| 2017/0094445 | A1* | 3/2017 | Shanmugam ......... H04W 4/008 |

FOREIGN PATENT DOCUMENTS

| | | | |
|---|---|---|---|
| WO | 2015104199 | A1 | 7/2015 |
| WO | 2015192895 | A1 | 12/2015 |

OTHER PUBLICATIONS

Supeala, Doru, "Wayfinder: Indoors Routing Guided by Beacons", Published on: Nov. 25, 2015 Available at: http://www.onyxbeacon.com/wayfinder-indoors-routing-guided-by-beacons/.

Dunn, Zach, "Ideas for Using Beacons in the Office", Published on: Sep. 17, 2015 Available at: https://robinpowered.com/blog/using-ibeacons-in-the-office-for-work/.

Kolodziej, et al., "Local Positioning Systems: LBS Applications and Services", In Publication of CRC Press, May 10, 2006, 1 page.

"10 Awesome Things You Can do today with iBeacons", Published on: Dec. 2013 Available at: http://blog.twocanoes.com/post/68861362715/10-awesome-things-you-can-do-today-with-ibeacons.

Dunn, Zach, "Using iBeacons to Sense Presence", Published on: Sep. 12, 2015 Available at: https://robinpowered.com/blog/using-ibeacons-to-detect-presence-in-a-room/.

"Turning Your Mobile Apps into One Context-Aware Data Collection Hub", Published on: Feb. 9, 2015 Available at: http://www.beaconcube.com/.

Murell, Dan, "The Connected Office: What Does IoT Mean for the Workplace?", Published on: Nov. 3, 2015 Available at: http://www.mutualmobile.com/posts/the-connected-office-what-does-iot-mean-for-the-workplace.

Wood, Becki, "Latest News, Views and Insights from the Purple WiFi Team", Published on: Dec. 8, 2014 Available at: http://www.purplewifi.net/wifi-or-beacons-for-location-based-services/.

Leddy, Patrick, "10 Things about Bluetooth Beacons You Need to Know", Published on: Jul. 24, 2015 Available at: http://academy.pulsatehq.com/bluetooth-beacons.

Conte, et al., "BlueSentinel: a first approach using iBeacon for an energy efficient occupancy detection system", In Proceedings of the 1st ACM Conference on Embedded Systems for Energy-Efficient Buildings, Nov. 5, 2014, 10 pages.

"International Search Report and Written Opinion Issued in PCT Application No. PCT/US2017/024643", dated Jul. 3, 2017, 14 Pages.

* cited by examiner

DYNAMICALLY MANAGING A LISTEN LIST OF BEACON AWARE DEVICES

BACKGROUND

Beacons are useful for micro-locating users of mobile devices. Beacons emit Bluetooth® low-energy (BLE) signals comprising one or more universally unique identifiers (UUIDs) and other parameters. Mobile devices that are Bluetooth® enabled may run software applications that listen for universally unique identifiers (UUIDs) transmitted by the beacons. The mobile devices can use a received UUID and the other parameters to determine the beacon's physical location. Once a listened-for UUID is received by the mobile device, the software application may run code to trigger some action, event, or notification.

Beacon technology can be used similarly to GPS, but with a reduced impact on battery life and better precision (e.g., micro-location). Beacon technology can also be used to enhance location enabled functionality indoors. For example, using beacon technology, a mobile device can approximately find its relative location inside a physical space such as an office building, a mall, a store, etc.

SUMMARY

The described technology provides a system and method for dynamically managing a listen list for beacon aware devices. A mobile device may be configured to listen for one or more beacon UUIDs based on a listen list. A contextual change may trigger an update of the listen list. The updated listen list may be based on collected contextual information. The update generates a new listen list of beacon UUIDs. The device receives the new listen list and may listen for one or more beacon UUIDs based on the new listen list.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

Figure 2:
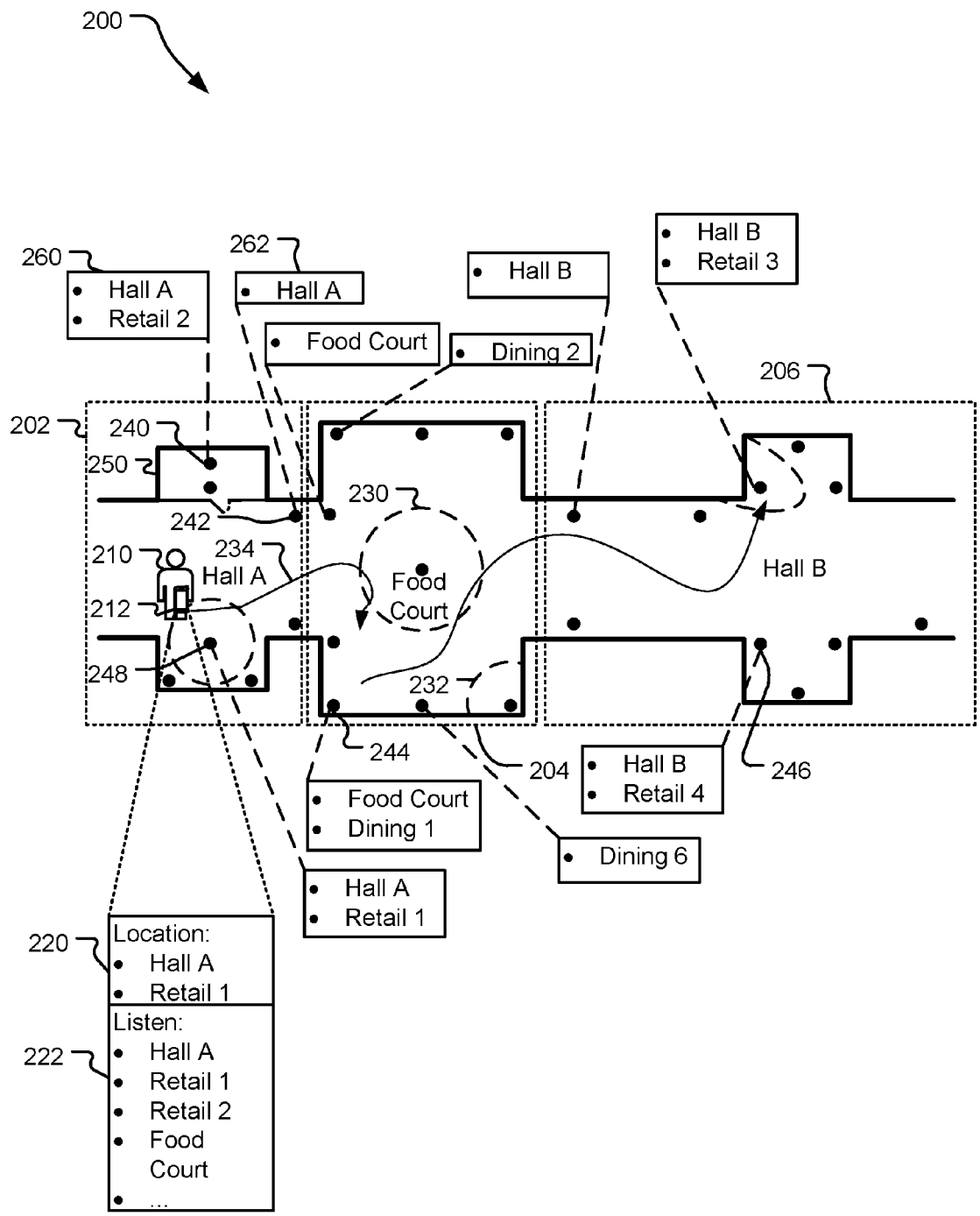
FIG. 2 illustrates another example environment for dynamically managing a listen list of beacon aware devices.
Figure 3:
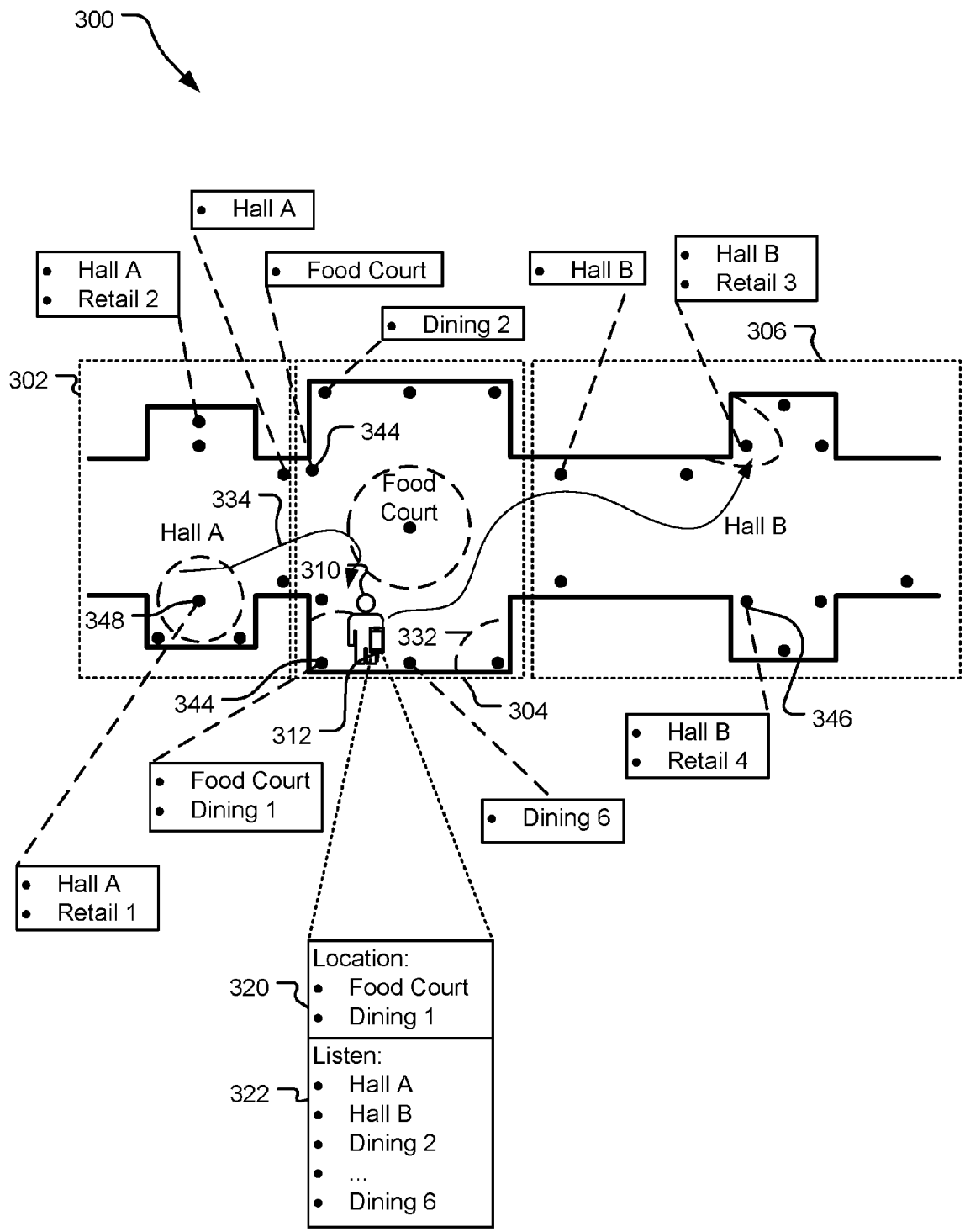

FIG. 3 further illustrates the environment for dynamically managing a listen list illustrated in FIG. 2.

Figure 4:
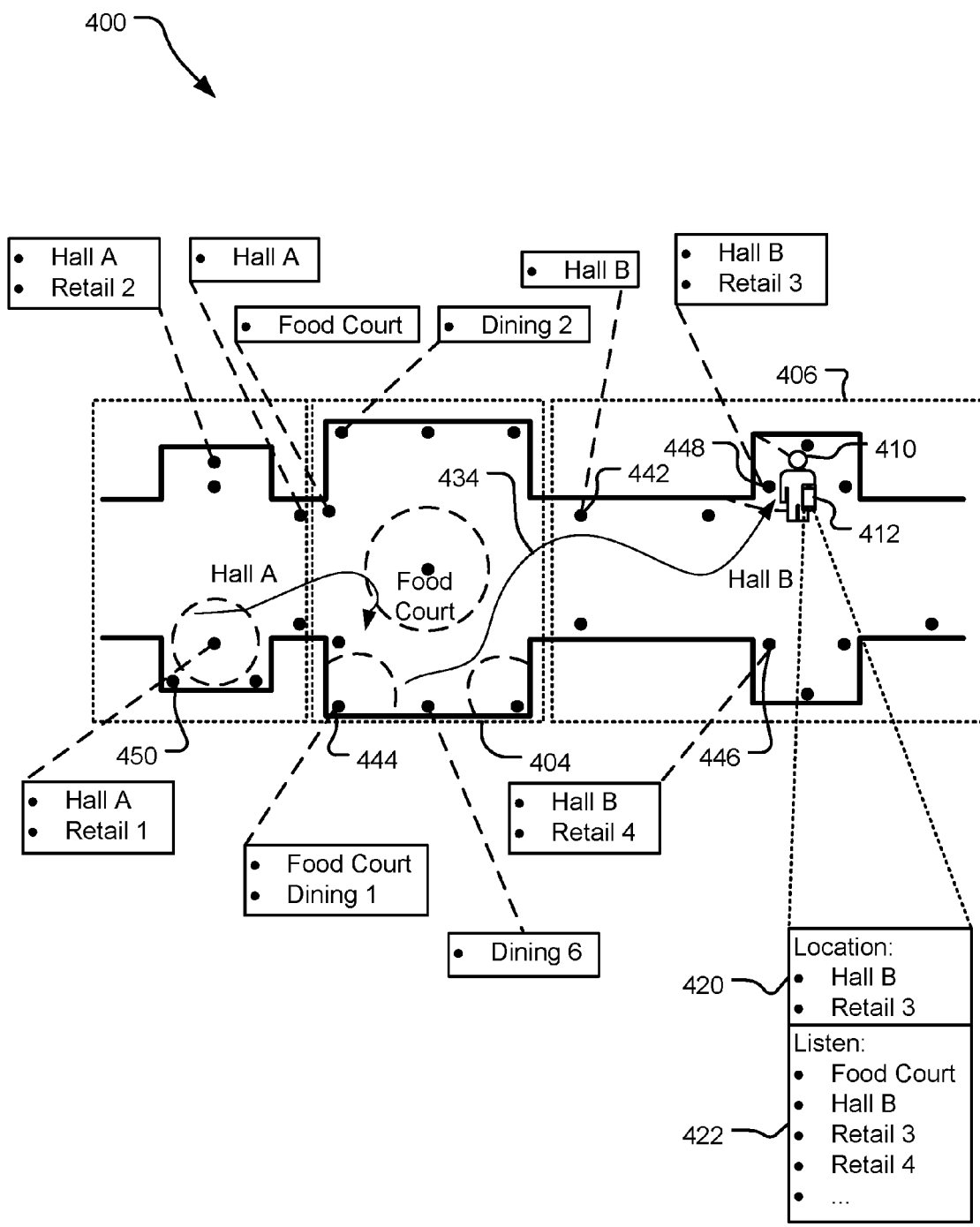

FIG. 4 further illustrates the environment for dynamically managing a listen list illustrated in FIG. 2 and FIG. 3.

Figure 5:
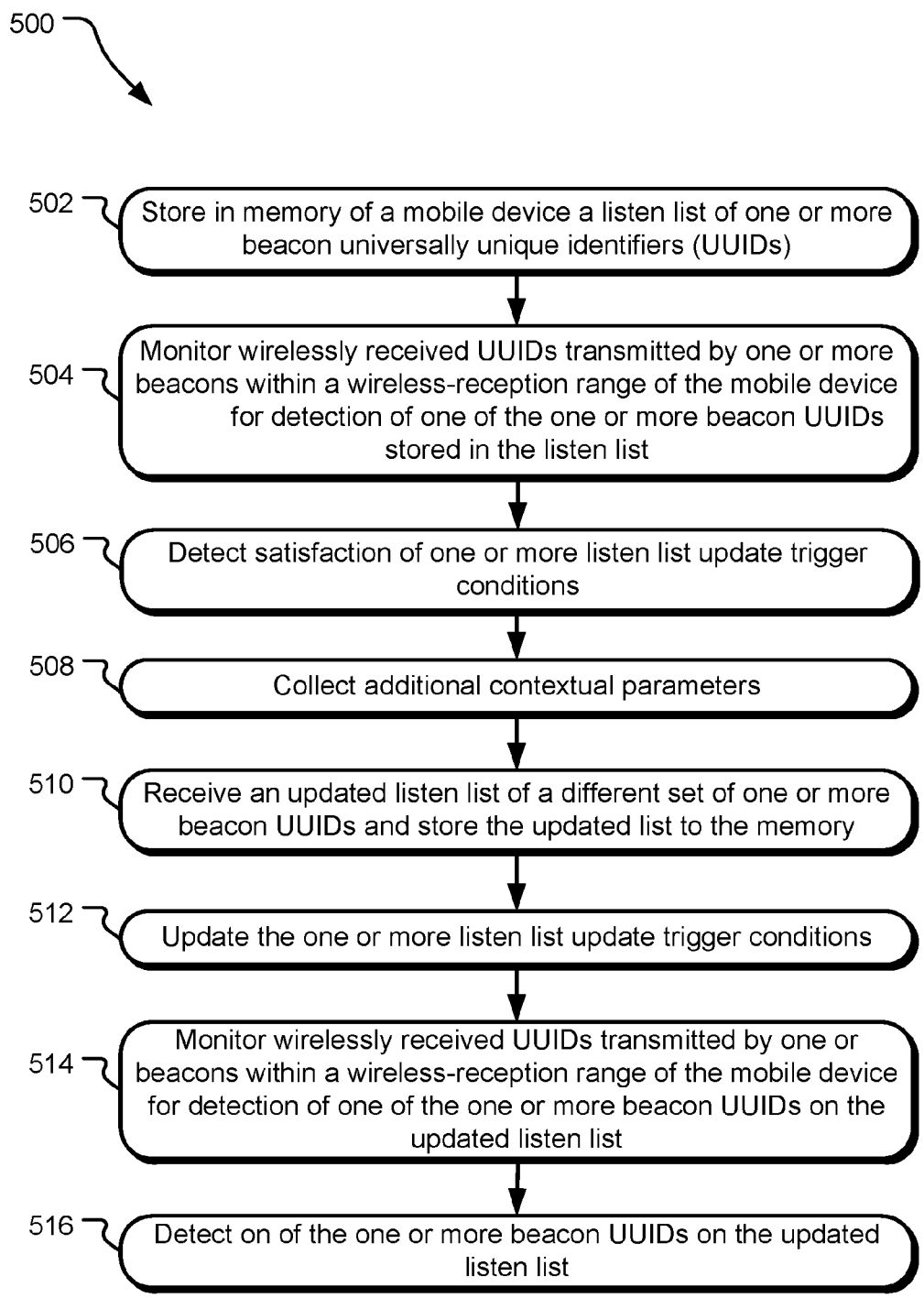

FIG. 5 illustrates example operations for dynamically managing a listen list of a beacon aware device.

Figure 6:
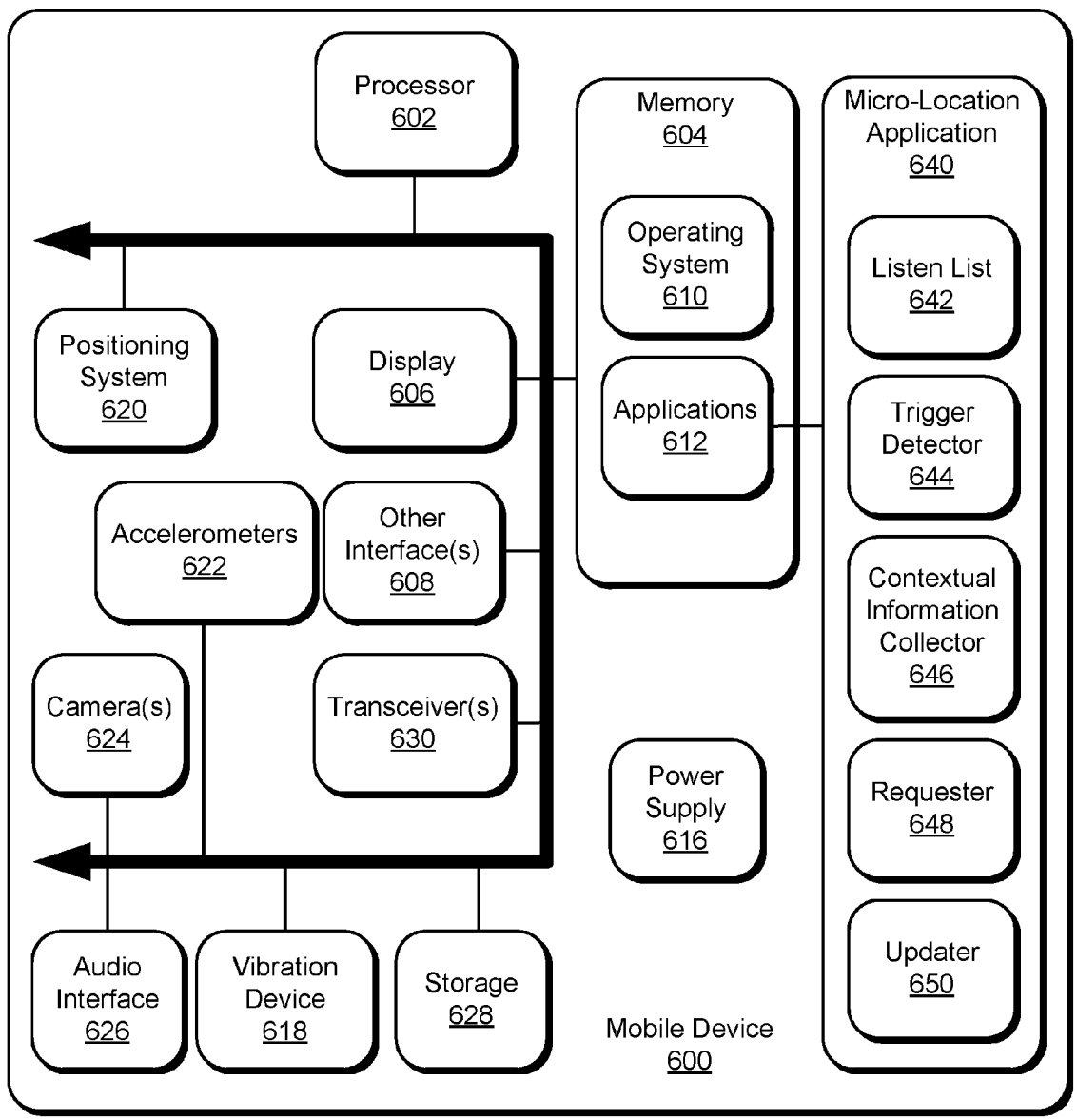

FIG. 6 illustrates an example system that may be useful in implementing the described technology.

Figure 7:
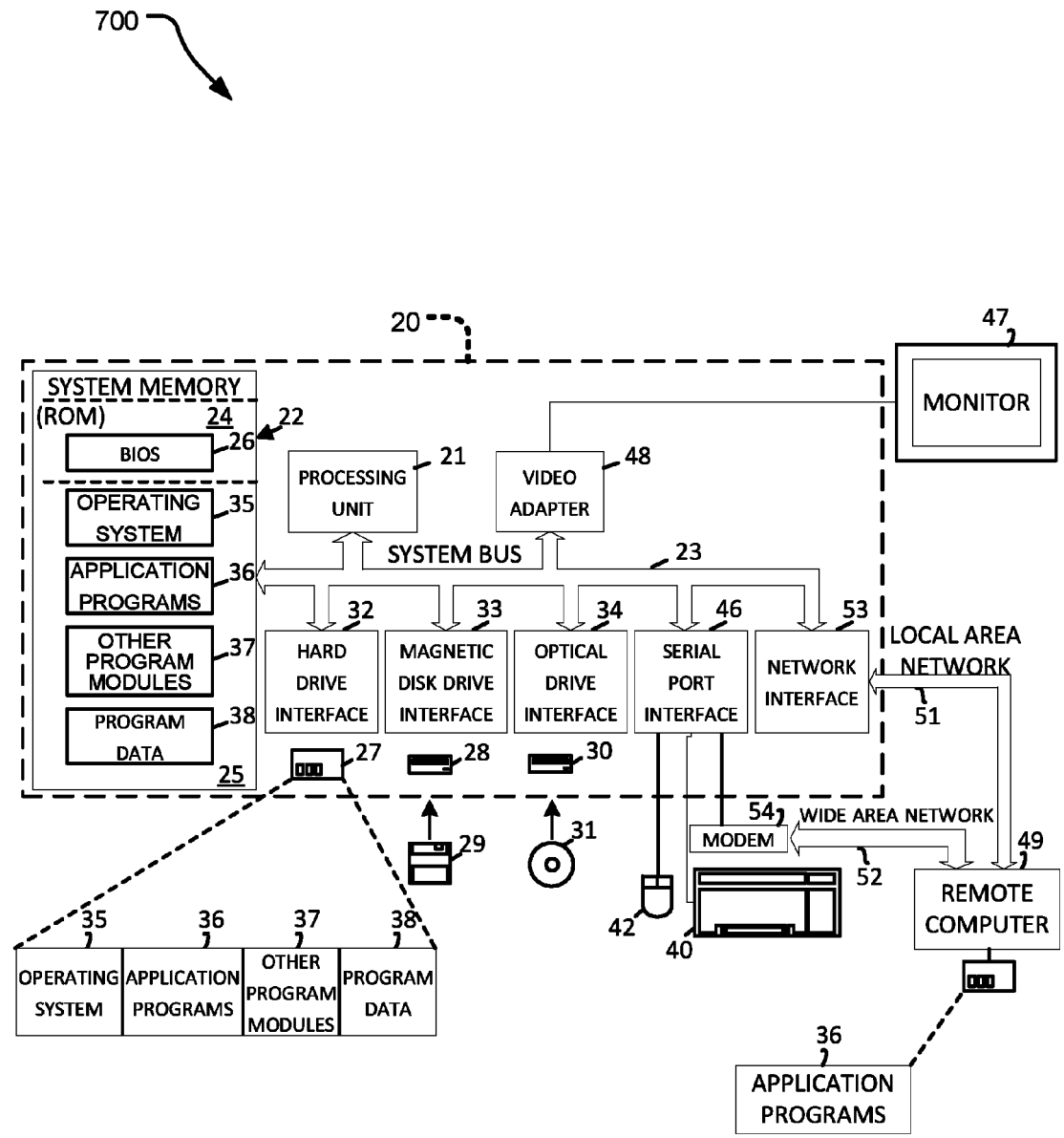

FIG. 7 illustrates another example system that may be useful in implementing the described technology

DETAILED DESCRIPTIONS

In light of battery constraints and the convenience of beacon detection to be performed in the background of mobile devices, most operating systems limit the number of beacon UUIDs a device can listen for (e.g., monitor) while an application is executing. Without this limitation, a device would be listening for any beacon and execute processor-executable operation (e.g., wake up) whenever a beacon UUID is detected. For example, walking down a hall of uniquely beaconed (e.g., each beacon has a different UUID) would keep the application active continuously and drain the battery quickly. Thus, only a finite set of beacon UUIDs are monitored by a device at any one time. This limitation also constrains the distribution of beacon UUIDs and the granularity of presence detection. For example, a company (internationally) would distribute less than 20 UUIDs enterprise-wide, leaving fewer UUIDs available for beacon-awareness in other locales or finer grained micro-location within the company (e.g., a particular building or floor within a building at a company campus).

Furthermore, overloading beacon UUIDs can cause incorrect presence detection results. For example, the same UUID from separate beacons in two closely-located conference rooms can cause a beaconing application to wake up or register when a user passes the first conference room on the way to the second conference room. If the user arrives at the second conference room within a timeout period (e.g., 30 seconds) then the application will not wake-up a second time. Thus, the beaconing application records the user at being at the wrong conference room. As such, UUIDs need to be distributed to beacons to avoid being able to detect the same UUID in two different locations within the same timeout period. However, given the limited set of available UUIDs for an application, even distribution of UUIDs within a complex environment is not always feasible and may be error prone.

To maximize micro-location granularity using a limited number of beacon UUIDs, a list of beacon UUIDs (hereinafter "listen list") for which an application monitors at any particular time are updated based on one or more detected changes in context. Rather than overloading UUIDs within a small locale, UUIDs are distributed intelligently through locales (e.g., different UUIDs for each room in a hallway or on a floor), with a focus on separating the same UUID for different beacons so that a user cannot detect the same UUID within the timeout period. If the user is detected as changing contexts (e.g., leaving a locale for another, the current time is approaching a meeting scheduled in a particular location at a particular time, turning on a presence application on the device, plugging the device into a location-specific port, such as a desktop dock, change in network connections (e.g., change in Wi-Fi signals, 3G, 4G, LTE connections), an update on a social media network, etc.), the beaconing system can re-evaluate the device's context and update the user's listen list with UUIDs for the new context and/or locale.

The implementations are described herein with respect to beacon signals that contain universally unique identifiers (UUIDs). It should be understood that the implementations described may be used with other formats such as with beacons that emit a well-formed Bluetooth packet followed by another identifying parameter. Furthermore, the implementations may be used with other low power signals with identifying information associated with a location.

Figure 1:
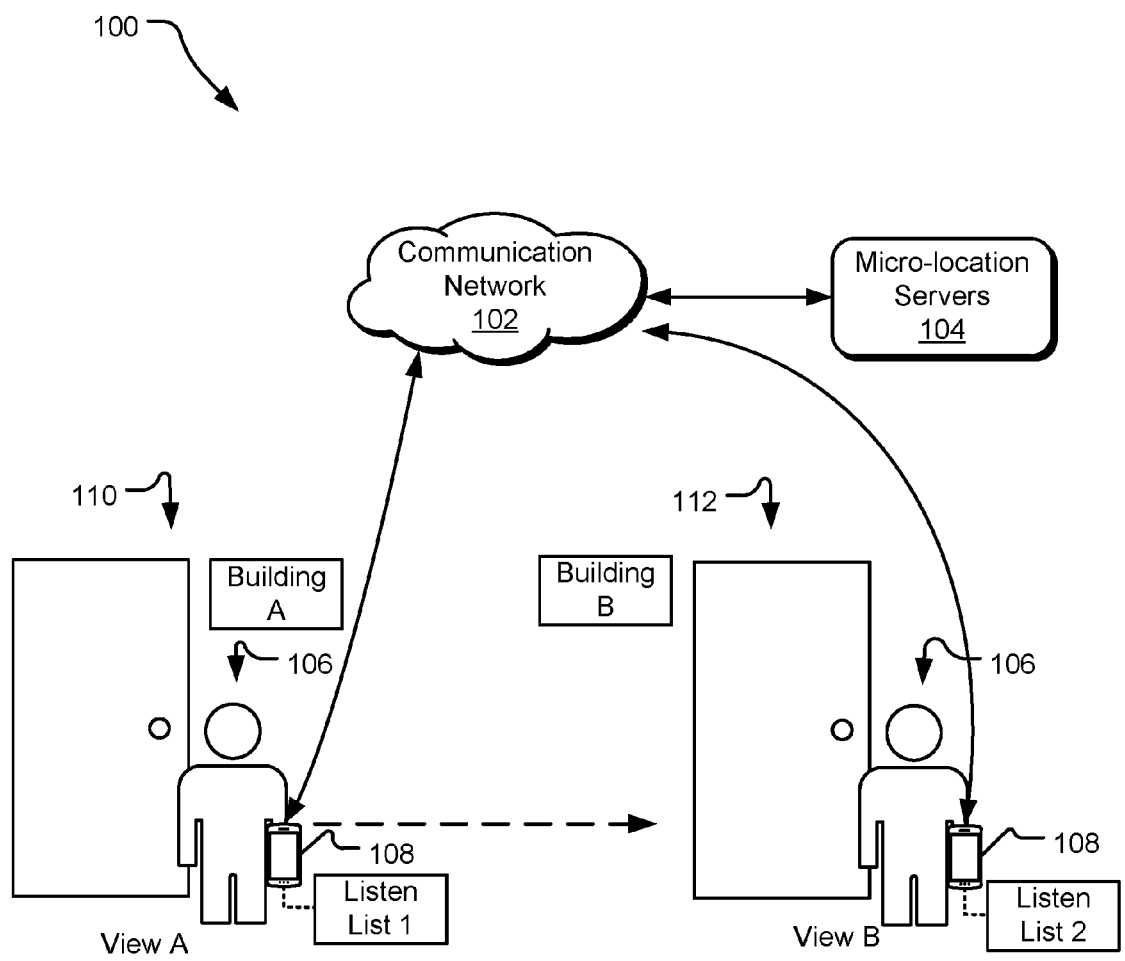
FIG. 1 illustrates an example environment for dynamically managing a listen list of beacon aware devices.

FIG. 1 illustrates an example environment 100 for dynamically managing a listen list of beacon aware devices. Specifically, FIG. 1 illustrates a use of dynamically managing a listen list in an office building environment. In views A and B, a user 106 has a mobile device 108 that communicates with a communication network 102. The mobile device 108 may be any type of device capable of communicating using wireless communication protocols (e.g., 3G, 4G, long-term evolution (LTE), Wi-Fi, Near Field Communication (NFC), Bluetooth®, Global Positioning System (GPS)) such as a tablet, personal digital assistant (PDA), mobile phone and other similar devices. The mobile device 108 may additionally communicate using other wireless communications means such as infra-red. The mobile device 108 uses one or more wireless communication protocols/means to communicate with the communication network 102. The communication network 102 facilitates communication between user devices (e.g., the mobile device 108) and one or more servers (e.g., micro-location servers 104).

The user 106 may have an application installed on mobile device 108 which is configured for environment 100. For example, the user 106 may have an employer application installed on the mobile device 108 that is tailored for one or more office buildings of environment 100. Information about beacon UUIDs and the UUIDs' associated locations on the employer campus or on a number of campuses may be stored locally to the mobile device 108 or may be stored in micro-location servers 104. In this illustrated implementation, environment 100 is a corporate campus including an office building A 110 illustrated by view A and a building B 112 illustrated by view B. Each building (e.g., building A 110 and building B 112) may have a set of beacons that are transmitting one or more UUIDs, the UUIDs being associated with rooms (e.g., offices, conference rooms), locations of interest (e.g., elevator locations, e.g., common rooms, welcome desks) and hallways in the buildings A 110 and B 112.

The application running on mobile device 108 may be aware of contexts of the user 106. Such contexts might include time of day, scheduled meetings, location (e.g., from a beacon or GPS location), etc. Because of these known contexts, the application might be configured to monitor (e.g., listen for) a first list of beacons (e.g., a listen list 1) while in or around building A 110. Listen list 1 may include UUIDs associated with the building A 110. For example, a first UUID might be associated with a cafeteria in the building A 110; a second UUID may be associated with the office of the user 106 in the building A 110; a third UUID may be associated with a conference room in the building A 110. As the user 106 moves about different locales within building A 110, the mobile device 108 detects different signals comprising the beacon UUIDs, which are associated with the particular locales. The application may respond by executing a processor executing operation such as sending the user 106 notifications about his location, events, or other information via the micro-location servers 104 and/or information stored on the mobile device 108. Furthermore, a second user may be able to see the location of the user 106 on the campus (or in the building). For example, if the second user has a scheduled meeting with the user 108 at a particular time in a conference room within building A 110, the second user may use the application on his/her device to locate the user 106. From the device, the second user may be able to push a reminder about the meeting to the user 106.

As the mobile device 108 detects beacon UUIDs, the application may execute processor-executable operations associated with particular beacon UUIDs. For example, the mobile device 108 may be aware that the user 106 has the meeting scheduled at a particular time in the conference room within building A 110 (e.g., from a calendar application running on the same device). Due to this awareness (e.g., a context), the application is listening for (e.g., monitoring) the beacon UUID associated with that conference room. Once the mobile device 108 detects the signal from the beacon UUID associated with the conference room (e.g., the user 106 enters the conference room), the application may trigger the associated processor-executable operation on the device. For example, the operation may cause an automatic push of a presentation to the device of the user 106 and/or other meeting attendees' devices; the code might send conference call information to the user; the code might contact the micro-location servers 104 to notify other meeting attendees' that the user 106 has arrived; etc. The particular operation that is triggered may depend on the context and the location, a particular implementation and/or user preferences. Other processor-executable operations may be employed.

When the context of the mobile device 108 changes, an update of the listen list may be triggered on the mobile device 108. For example, an update of the listen list may be triggered by the end of a scheduled meeting, by the start of another meeting, by a change in location (e.g., GPS location or beacon detection), by preferences of the user 106 stored on the mobile device 108, etc. As a result of the trigger, the mobile device 108 may collect contextual information/parameters such as date, time, location, weather, calendar events (e.g., meetings), etc., and/or the device may request contextual information from the user 106. Once the contextual information is collected, the mobile device may update the listen list based on the contextual information. For example, the contextual parameters may be user defined preferences (e.g., to avoid listening for certain beacon GUIDs). The collected contextual parameters may be sent to micro-location servers 104 wherein a new list is generated based on the contextual information and/or other parameters. Alternatively, the mobile device itself may generate the new listen list based on the collected contextual parameters and/or locally stored parameters (e.g., application defined parameters). Once the mobile device 108 receives the new listen list, the mobile device 108 will listen for the UUIDs within that list.

For example, if the meeting in building A 110 concludes, then the mobile device 108 (e.g., via an application) may be aware that the meeting has concluded based on contextual parameters such as the current time, the detection of a UUID associated with another locale, a GPS location change detection, etc. Based on the contextual parameters (e.g., a context change), the mobile device 108 may trigger a listen list update. To update the listen list, the device may collect contextual information, such as current location and time, and calendar information, etc. For example, the application may be aware that the user 106 has another meeting scheduled in meeting B, and the mobile device 108 may detect that the user 106 is leaving the vicinity of building A 110 (e.g., the mobile device 108 detects a UUID associated with an exit of building A 110). Based on the contextual information, the mobile device 108 may initiate a listen list update for beacon UUIDs associated with locales in building B 112 (e.g., a listen list 2). When the user enters building B 112, the application will be configured to listen to those beacon UUIDs associated with building B 112 (e.g., the listen list 2). Again, the beacon UUIDs in the new listen list may be used to run different processor-executable operations as the user 106 moves about different locals within building B 112 and the mobile device 108 detects different beacons UUIDs associated with different processor-executable operations.

The implementations and methods described above may be used to dynamically manage a listen list of beacon UUIDs based on contextual information. In this manner, a limited set of beacon UUIDs may be spaced about a location and used such that micro-location granularity may be improved. Furthermore, the listen list of UUIDs may be minimized based on the contextual information to enhance battery life. The implementations and methods are described further with respect to the following figures.

FIG. 2 illustrates another example environment 200 for dynamically managing a listen list of beacon aware devices. Specifically, environment 200 illustrates the described system implemented in a shopping mall. The mall includes a Hall A 202, a Food Court 204, and a Hall B 206. It should be understood that the configuration of the mall is for illustrative purposes, and other configurations may be employed. The mall includes a number of beacons (e.g., beacons 240, 242, 244, 246) distributed throughout the mall. Each beacon's UUID may be associated with a particular location or store (e.g., a store 250) by an application configured for the shopping mall. Boxes (e.g., boxes 260, and 262) list locations associated with certain beacons (e.g., box 262 shows that beacon 242 is associated with the location "Food Court"). Selected beacons (e.g., beacon 240) are configured as rotational or hybrid beacons. Rotational or hybrid beacons include hardware and/or software that broadcasts more than one beacon identifier (e.g., UUID) by "rotating" through the list of beacons that it is representing. Other configurations of beacons that simultaneously broadcast different identifying signals (e.g., UUIDs) may be used. For example, the implementations may use beacons that broadcast identifying information using different frequencies and/or protocols. For example, the beacon 240 sends out a UUID associated with the location "Hall A" and a UUID associated with the location "Retail 2," as illustrated by the box 260. Dotted lines (e.g., dotted lines 230 and 232) represent the signal of the beacons. Not all beacons are shown having a signal, but it should be understood that all of the beacons are transmitting one or more signals comprising a UUID. It should be understood that any combination of single UUID beacons and/or rotational beacons may be utilized in implementations described herein. It should also be understood that other beacon configurations may be used such as directional beacons that are configured to broadcast in selected directions.

A user 210 with a device 212 is standing at a location in range of beacon's 248 signal. The device 212 has the application running the system described herein. The application may be customized for the environment 200 (e.g., the particular mall illustrated) with beacon UUID and location information stored locally on the device 212 or in a microlocation server (not shown). Due to the device 212 being within range of beacon's 248 signal, the application is aware of a current location information 220. The current location information 220 demonstrates the current location of the user 210 with the device 212 is Hall A and Retail 1. A listen list 222 is currently exhibiting that the device is listening/monitoring for UUID's associated with Hall A, Retail 1, Retail 2, and Food Court. The listen list 222 may be configured based on the current context of the user 210. For example, because the user 210 is located in Hall A 202, the listen list 222 is listening for UUID's associated with any Retail stores located within Hall A (e.g., Retail 2 and Retail 1) and any exit points of that particular locale (e.g., Food Court 204). The application is not listening for beacons (e.g., the beacons are not on the listen list 222) that are out of context (e.g., beacon 244 in the Food Court 204 or beacon 246 in the Hall B 206) to save resources (e.g., processing power and battery power) on the mobile device 212.

As the user 210 walks towards the Food Court 204 (e.g., a walking direction illustrated by an arrow 234), the listen list 222 may be dynamically managed and updated based on the change of context. Changes in context are illustrated in FIG. 3 and FIG. 4 and described hereinafter.

FIG. 3 further illustrates the environment 300 for dynamically managing a listen list illustrated in FIG. 2. Specifically, FIG. 3 shows a user 310 with a device 312 in a different location from the location shown in FIG. 2. The user 310 has walked from the location next to a beacon 348 in a Hall A 302 to the Food Court 304 (e.g., the user has walked in a direction illustrated by an arrow 334). As the user 310 walks the application on the device 312 is dynamically managing a listen list 322 of beacon UUIDs. When in the location illustrated in FIG. 2, the application was listening/monitoring for a UUID associated with the Food Court 304 (e.g., the UUID associated with the Food Court was on the listen list 222, because the Food Court was an exit point to that locale). As the user 310 walks, the application detects a UUID associated with the Food Court (e.g., the application detects the UUID signal from beacon 344). The detection of the UUID associated with the Food Court may have triggered an update to the listen list. For example, due to the detection of the UUID associated with the Food Court, the application may infer that the user 310 is walking from Hall A 302 to the Food Court 304. Based on this inference (e.g., detection of a contextual change), the application has updated the listen list 322.

The listen list 322 lists UUIDs associated with eating establishments and other stores within the Food Court 304 (e.g., dining 2 to dining 6). The listen list 322 lists UUIDs associated with any exits from the Food Court (e.g., Hall A 302 and Hall B 304). The exit beacon UUIDs (e.g., Hall A and Hall B) may be stored as triggers for a listen list update. The application is not listening for beacons which may be out of context (e.g., beacons 346 and 348). Furthermore, a current location information 320 demonstrates that the current location is Food Court and dining 1, due to the user being within a signal of a beacon 344.

FIG. 4 further illustrates the environment 400 dynamically managing a listen list illustrated in FIG. 2 and FIG. 3. Specifically, FIG. 4 shows a user 410 with a device 412 in a different location from the locations shown in FIG. 2 and FIG. 3. The user 410 has walked from the location next to a beacon 444 in a Food Court 404 to a Hall B 406 (e.g., the user has walked in a direction illustrated by an arrow 434). As the user 410 walks an application on the device 412 is dynamically managing a listen list 422 of beacon UUIDs. When in the location illustrated in FIG. 3, the application was listening for a UUID associated with the Hall B 406 (e.g., the UUID associated with the Hall B was on the listen list 322 in FIG. 3, because Hall B was an exit point for that locale). As the user 410 walks, the application detects a UUID associated with the Food Court (e.g., it detects the UUID signal from beacon 444). The detection of the UUID associated with the Hall B (e.g., from beacon 444) triggers a listen list update. For example, due to the detection of the beacon UUID associated with the Food Court, the application may infer that the user 410 is walking from the Food Court 404 to the Hall B 406. Based on this inference (e.g., detection of a contextual change), the application has updated the listen list 422.

The listen list 422 lists beacon UUIDs associated with retail stores and other stores within the Hall B 406 (e.g., Retail 3 and Retail 4). The listen list 422 is also lists UUIDs associated with any exits from the Hall B 406 (e.g., Food Court). The exit beacon UUIDs (e.g., Food Court) may be stored as triggers for a listen list update. The application is not listening for beacons which may be out of context (e.g., beacons 444 and 450). Furthermore, a current location information 420 demonstrates that the current location Hall B and Retail 3, due to the user being within a signal of a beacon 448.

FIGS. 2-4 illustrate that the listen list on the device is dynamically updated based on contextual user parameters (e.g., time, location, calendar events). As the user travels within the mall, the application on the device updates the new listen list based on the contextual parameters and collected contextual information. The mall was used for illustrative purposes, and it should be understood that the dynamically updating listen list can be implemented in other context such as school campuses, amusement parks, office buildings and campuses, resorts, casinos, hotels, hospitals, etc.

Furthermore, the processor-executable operation triggered due to the detection of a particular UUID can be customizable based on the implementation. For example, in a casino/hotel context, if a user's device detects a UUID associated with his or her room, then the application may operate to automatically unlock the user's room, start a pot of coffee, turn on the TV or air conditioner, etc.

Furthermore, the triggers that start the update of the listen list can also be customizable. As discussed above, the update may occur in response to detected user contextual parameters and may be based on location, time, or calendar contexts. Additionally, the updated list may be based on collected additional contextual parameters/information. As a result, the user contextual parameters may the basis of listen list update trigger conditions as well as the basis for the updated listen list. In some implementations, the triggers and listen list updates may be customizable by the user or based on the implementation. For example, a user walking down a street with shops and restaurants may not want to listen for UUIDs associated with restaurants. The user may be able to selectively ignore those UUIDs through the application on the device. User preferences may impact monitoring rules or triggering conditions that are active at a given point in time. In some implementations, available beacons may be based on corporate or application provider policies/settings which are customized through a beaconing application. For example, a corporation's implementation of a beaconing application may selectively hide certain beacons from employees based on security level (e.g., a CEO's private meeting space may be hidden from any employee that is not a C level employee.). In another example, certain beacon UUIDs may be hidden based on the time of day. Other customization techniques may be employed by the user and/or the application provider.

FIG. 5 illustrates example operations 500 for dynamically managing a listen list of a beacon aware device (e.g., a mobile device). The operations 500 may be performed and/or controlled by an application encoded by processor readable instructions stored on memory and executable by one or more processors. A storing operation 502 stores in memory of a mobile device a listen list of one or more beacon universally unique identifiers (UUIDs). The storing operation 502 may occur in response to a user downloading an application to a user device, an update to an application on a user device, a previous listen list update, an operating system on the mobile device performing an operation, etc. A monitoring operation 504 monitors wirelessly received UUIDs transmitted by one or more beacons within a wireless-reception range of the mobile device for detection of one of the one or more beacon UUIDs stored in the listen list. As the mobile device monitors the received the UUIDs, the device may detect one of the UUIDs listed on the listen list and perform a processor-executable operation in response to detection. The processor-executable operation may be associated with the application stored on the mobile device. The wireless-reception range of the mobile device is a locale in which the mobile device is detecting beacon signals emitted by one or more beacons.

A detecting operation 506 detects satisfaction of one or more listen list update trigger conditions. The one or more listen list update trigger conditions may be based on one or more detected user contextual parameters. For example, the application may be monitoring the context (e.g., time, location, calendar events, current network) of the user's mobile device for satisfaction of one or more listen list update trigger conditions. A user contextual parameter may be anything that indicates the context of the user. The listen list update trigger conditions may be defined by the application, user, cloud, etc. Furthermore, the cloud may monitor the user contextual parameters (e.g., calendar event information stored on the cloud, social media updates, etc.). In some implementations, the cloud and the mobile device in combination may detect user contextual parameters.

In response to the detecting operation 506, a collecting operation 508 collects additional contextual parameters to reevaluate the user's current context and/or locale. For example, a device may detect a satisfaction of one or more listen list update trigger conditions (e.g., the device or cloud may detect that a user has a meeting in an hour), which initiates the listen list update process. In response, the device may collect additional contextual information, such as the current location. The device or cloud may use the current location and upcoming meeting to update the listen list. For example, the new list may be updated to reflect the user's current locale and the locale of the upcoming meeting. As a result, user context (e.g., user contextual parameters) may be the basis for the listen list update trigger condition as well as the basis for the updated listen list.

A receive operation 510 receives an updates listen list of a different set of one or more beacon UUIDs and stores the updated listen list to the memory. The updated listen list may be received from an index of UUIDs stored on the device itself and associated with the application or may be received from the cloud. Instead of receiving a new listen list, the mobile device may update the current list. An updating operation 512 updates the one or more listen list update trigger conditions. The updated trigger conditions may be based on contextual user parameters such as another upcoming meeting or it may be based on the current locale (e.g., setting exit points of the current locale as listen list update trigger conditions). Other contextual user parameters and listen list update trigger conditions may be employed.

A second monitoring operation 514 monitors wirelessly received UUIDs transmitted by one or more beacons within a wireless-reception range of the mobile device for detection of one of the one or more beacon UUIDs on the updated listen list. A detecting operation 516 detects one of the one or more beacon UUIDs on the updated listen list. In response to the detecting operation 516, the device may perform a processor-executable operation that may be associated with the application or mobile device.

FIG. 6 illustrates an example system (labeled as a mobile device 600) that may be useful in implementing the described technology. The mobile device 600 includes a processor 602, a memory 604, a display 606 (e.g., a touch-screen display), and other interfaces 608 (e.g., a keyboard). The memory 604 generally includes both volatile memory (e.g., RAM) and non-volatile memory (e.g., flash memory). An operating system 610 resides in the memory 604 and is executed by the processor 602.

One or more application programs 612, such as a micro-location application 640, are loaded in the memory 604 and executed on the operating system 608 by the processor 602. Beacon UUID and associated location information, listen list update trigger conditions, user contextual parameters, current location information, processor-executable operations, user preferences, and other data may be stored in the memory 604 in association with applications 612.

Different modules of the micro-location application 640 enable dynamic management of a listen list of beacon UUIDs. The modules may comprise processor-executable instructions for executing the different features of the application. For example, the micro-location application 640 may include a listen list 642, a trigger detector 644, a contextual information collector 646, a requester 648, and an updater 650. The listen list 642 may hold current listening information such as current beacon UUIDs. The listen list 642 may be sent to a Bluetooth® chip such that a Bluetooth® antenna may listen for beacon signals comprising the UUIDs. The trigger detector 644 detects listen list update trigger conditions such that the listen list 642 may be updated. For example, the trigger detector 644 may store and listen for conditions (e.g., times and GPS/beacon locations). When one or more listen list update trigger conditions are met, the trigger detector 644 detects the conditions and initiates the process of updating the listen list. The contextual information collector 646 may collect contextual information (e.g., parameters) for the listen list update. For example, the contextual information collector 646 may collect a current time, a current location, upcoming calendar events, a current temperature, user preferences, application provider policies/settings, social media updates, etc. The contextual information/parameters may be packaged and sent to a server for updating the list or may be sent another module (e.g., list updater) within the micro-location application 640. The requester 646 may request a listen list based on the the collected contextual information. After the requester 646 requests a new listen list, the listen list 642 may be updated with the new listen list. The updater 650 operates to update the listen list update trigger conditions. Alternatively, the current listen list may be updated rather than retrieved from another location.

The micro-location application 640 may further include the list updater and action module (e.g., actions that may be commenced in response to a detection of a UUID on the listen list 642). Furthermore, the micro-location application and may store potential UUIDs and associated locations. The micro-location application 640 may be configured to communicate (e.g., Wi-Fi or other data transfer protocol) with a micro-location server (not shown). The micro-location server may store UUID/location associations and may operate to update the listen list.

The mobile device 600 includes a power supply 616, which is powered by one or more batteries or other power sources and which provides power to other components of the mobile device 600. The power supply 616 may also be connected to an external power source that overrides or recharges the built-in batteries or other power sources.

The mobile device 600 includes one or more communication transceivers 630 to provide network connectivity (e.g., mobile phone network, Wi-Fi®, Bluetooth®, etc.). The mobile device 600 also includes various other components, such as a positioning system 620 (e.g., a global positioning satellite transceiver, Bluetooth® low energy (BLE)), one or more accelerometers 622, one or more cameras 624, an audio interface 626 (e.g., a microphone, an audio amplifier and speaker and/or audio jack), and additional storage 628. Other configurations may also be employed.

In an example implementation, a mobile operating system, various applications, and other modules and services may be embodied by instructions stored in memory 604 and/or storage devices 628 and processed by the processing unit 602. User preferences, service options, and other data may be stored in memory 604 and/or storage devices 628 as persistent datastores.

The mobile device 600 may include a variety of tangible computer-readable storage media and intangible computer-readable communication signals. Tangible computer-readable storage can be embodied by any available media that can be accessed by the mobile device 600 and includes both volatile and nonvolatile storage media, removable and non-removable storage media. Tangible computer-readable storage media excludes intangible communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the mobile device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

FIG. 7 illustrates another example system that may be useful in implementing the described technology. The example hardware and operating environment of FIG. 7 for implementing the described technology includes a computing device, such as a general purpose computing device in the form of a computer 20, a mobile telephone, a personal data assistant (PDA), a tablet, smart watch, gaming remote, or other type of computing device. In the implementation of FIG. 7, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate images via a monitor 47 of the personal computer 20, and in some cases display input may be assisted by input provided through other input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as a remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 7 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, beacon UUIDs may be stored in memory 22 and/or storage devices 29 or 31 and processed by the processing unit 21. For example, the memory 22 may store a plurality beacon UUIDs and associated location information, listen list update trigger conditions, user contextual parameters, processor-executable operations, user preferences, application provider policies/settings, and other data.

An example method includes storing in memory of a mobile device a listen list of one or more beacon universally unique identifiers (UUIDs) associated with an application executable on the mobile device. The method further includes monitoring wirelessly received UUIDs transmitted by one or more beacons within a wireless-reception range of the mobile device. The mobile device is configured to perform a processor-executable operation upon detection of a beacon UUID stored in the listen list, the processor-executable operation being associated with the detected beacon UUID and the application. The method further includes updating the listen list associated with the application and stored in the memory of the mobile device with a different set of one or more beacon UUIDs, responsive to one or more detected user contextual parameters satisfying one or more listen list update trigger conditions.

Another example method of any preceding method further includes the one or more listen list update trigger conditions being based on a GPS location of the mobile device.

Another example method of any preceding method further includes the one or more listen list update trigger conditions being based on a detection of a beacon UUID.

Another example method of any preceding method further includes the one or more listen list update trigger conditions being based on a calendar event.

Another example method of any preceding method further includes updating the listen list including updating the one or more listen list update trigger conditions.

Another example method of any preceding method further includes updating the listen list including receiving the different set of one or more beacon UUIDs from a network.

Another example method of any preceding method further includes updating the listen list including receiving the different set of one or more beacon UUIDs from the memory of the mobile device.

Another example method of any preceding method further includes the different set of one or more beacon UUIDs being based on one or more collected additional user contextual parameters.

Another example method of any preceding method includes the one or more collected additional user contextual parameters being at least one of a current time, a location, application policies, and a user preference.

Another example method of any preceding method includes updating the listen list further including collecting one or more additional user contextual parameters.

One or more tangible processor-readable storage media embodied with instructions for executing on one or more processors and circuits of a device an example process for location, the example process includes storing in memory of a mobile device a listen list of one or more beacon universally unique identifiers (UUIDs). The example process further includes monitoring wirelessly received UUIDs transmitted by one or more beacons within a wireless-reception range of the mobile device. The mobile device is configured to perform a processor-executable operation upon detection of a beacon UUID stored in the listen list. The processor-executable operation is associated with the detected beacon UUID. The example process further includes updating the listen list stored in the memory of the mobile device with a different set of one or more beacon UUIDs, responsive to one or more detected user contextual parameters satisfying one or more listen list update trigger conditions.

Another one or more tangible processor-readable storage media of any preceding processor-readable storage media wherein the example process further includes monitoring contextual information to detect the satisfaction of one or more listen list update trigger conditions.

Another one or more tangible processor-readable storage media of any preceding processor-readable storage media wherein the example process further includes the one or more listen list update trigger conditions being based on a GPS location of the mobile device.

Another one or more tangible processor-readable storage media of any preceding processor-readable storage media wherein the example process further includes the one or more listen list update trigger conditions being based on a detection of a beacon UUID.

Another one or more tangible processor-readable storage media of any preceding processor-readable storage media wherein the example process further includes the one or more listen list update trigger conditions being based on a calendar event.

Another one or more tangible processor-readable storage media of any preceding processor-readable storage media wherein the example process further includes the different set of one or more beacon UUIDs being based on one or more collected additional user contextual parameters.

Another one or more tangible processor-readable storage media of any preceding processor-readable storage media wherein the example process further includes the collected additional user contextual parameters including at least one of a current time, a location, application policies, and a user preference.

Another one or more tangible processor-readable storage media of any preceding processor-readable storage media wherein the example process further includes updating the listen list including updating the one or more trigger conditions.

An example system includes one or more processors; a memory; and a location application stored in the memory and executable by the one or more processors. The location application is configured to store in the memory a listen list of one or more beacon universally unique identifiers (UUIDs) associated with the location application. The location application is further configured to monitor wirelessly received UUIDs transmitted by one or more beacons. The location application is further configured to perform an operation executable by the one or more processors upon detection of a beacon UUID stored in the listen list, the operation being associated with the detected beacon UUID and the application. The location application is further configured to update the listen list stored in the memory with a different set of one or more beacon UUIDs, responsive to one or more detected user contextual parameters satisfying one or more listen list update trigger conditions.

Another example system of any preceding system includes the location application being further configured to update the one or more listen list update trigger conditions.

Another example system of any preceding system includes the location application being further configured to collect one or more additional user contextual parameters responsive to the detection of satisfaction of the one or more listen list update trigger conditions, and the different set of one or more beacon UUIDs is based at least on the one or more additional user contextual parameters.

An example system includes means for storing in memory of a mobile device a listen list of one or more beacon universally unique identifiers (UUIDs) associated with an application executable on the mobile device. The example system further includes means for monitoring wirelessly received UUIDs transmitted by one or more beacons within a wireless-reception range of the mobile device. The mobile device includes means for performing a processor-executable operation upon detection of a beacon UUID stored in the listen list. The processor-executable operation is associated with the detected beacon UUID and the location application. The system further includes means for updating the listen list stored in the memory of the mobile device with a different set of one or more beacon UUIDs, responsive to one or more detected user contextual parameters satisfying one or more listen list update trigger conditions.

Another example system of any preceding system further includes support for the one or more listen list update trigger conditions being based on a GPS location of the mobile device.

Another example system of any preceding system further includes support for the one or more listen list update trigger conditions being based on a detection of a beacon UUID.

Another example system of any preceding system further includes support for the one or more listen list update trigger conditions being based on a calendar event.

Another example system of any preceding system further includes means for updating the one or more listen list further including means for updating the one or more listen list update trigger conditions.

Another example system of any preceding system further includes means for updating the one or more listen list further including means for receiving the different set of one or more beacon UUIDs from a network.

Another example system of any preceding system further includes means for updating the one or more listen list further including means for receiving the different set of one or more beacon UUIDs from the memory of the mobile device.

Another example system of any preceding system further includes means for the different set of one or more beacon UUIDs being based on on one or more collected additional user contextual parameters.

Another example system of any preceding system further includes means for the one or more collected additional user contextual parameters being at least one of a current time, a location, application policies, and a user preference.

Another example system of any preceding system further includes means for updating the listen list including collecting one or more additional user contextual parameters.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A location method comprising:
   storing in memory of a mobile device a listen list of one or more beacon universally unique identifiers (UUIDs) associated with an application executable on the mobile device, the one or more beacon UUIDs corresponding to a first locale of the mobile device;
   monitoring wirelessly received beacon UUIDs transmitted by one or more beacons within a wireless-reception range of the mobile device, the mobile device being configured to perform a processor-executable operation upon detection of a beacon UUID stored in the listen list, the processor-executable operation being associated with the detected beacon UUID and the application;
   detecting a change in one or more monitored user contextual parameters satisfying one or more listen list update trigger conditions, the change in the one or more monitored user contextual parameters indicating movement of the mobile device to a second locale corresponding to a different set of one or more beacon UUIDs; and
   updating the listen list associated with the application and stored in the memory of the mobile device with the different set of one or more beacon UUIDs, responsive to satisfaction of the one or more listen list update trigger conditions.

2. The location method of claim 1, wherein the one or more listen list update trigger conditions are based on a detected GPS location of the mobile device.

3. The location method of claim 1, wherein the one or more listen list update trigger conditions are based on a detection of a beacon UUID.

4. The location method of claim 1, wherein the one or more listen list update trigger conditions are based on a calendar event.

5. The location method of claim 1, wherein updating the listen list further comprises updating the one or more listen list update trigger conditions.

6. The location method of claim 1, wherein updating the listen list further comprises receiving the different set of one or more beacon UUIDs from a network.

7. The location method of claim 1, wherein updating the listen list further comprises receiving the different set of one or more beacon UUIDs from the memory of the mobile device.

8. The location method of claim 1, wherein the different set of one or more beacon UUIDs is based on one or more collected additional user contextual parameters.

9. The location method of claim 8, wherein the one or more collected additional user contextual parameters includes at least one of a current time, a location, application policies, and a user preference.

10. The location method of claim 1, wherein updating the listen list further comprises collecting one or more additional user contextual parameters.

11. One or more tangible processor-readable storage media embodied with instructions for executing on one or more processors and circuits of a device a process for location, the process comprising:
    storing in memory of a mobile device a listen list of one or more beacon universally unique identifiers (UUIDs), the one or more beacon UUIDs corresponding to a first locale of the mobile device;
    monitoring wirelessly received UUIDs transmitted by one or more beacons within a wireless-reception range of the mobile device, the mobile device being configured to perform a processor-executable operation upon detection of a beacon UUID stored in the listen list, the processor-executable operation being associated with the detected beacon UUID;
    detecting a change in one or more monitored user contextual parameters satisfying one or more listen list update trigger conditions, the change in the one or more monitored user contextual parameters indicating movement of the mobile device to a second locale corresponding to a different set of one or more beacon UUIDs; and
    updating the listen list stored in the memory of the mobile device with the different set of one or more beacon UUIDs, responsive to satisfaction of the one or more listen list update trigger conditions.

12. The one or more tangible processor-readable storage media of claim 11, wherein the listen list update trigger condition is based on a detected GPS location of the mobile device.

13. The one or more tangible processor-readable storage media of claim 11, wherein the one or more listen list update trigger conditions are based on a detection of a beacon UUID.

14. The one or more tangible processor-readable storage media of claim 11, wherein the one or more listen list update trigger conditions are based on a calendar event.

15. The one or more tangible processor-readable storage media of claim 11, wherein the different set of one or more beacon UUIDs is based on one or more collected additional user contextual parameters.

16. The one or more tangible processor-readable storage media of claim 15, wherein the one or more collected additional user contextual parameters includes at least one of a current time, a location, application policies, and a user preference.

17. The one or more tangible processor-readable storage media of claim 11, wherein updating the listen list further comprises updating the one or more listen list update trigger conditions.

18. A system for location comprising:
one or more processors;
a memory; and
a location application stored in the memory and executable by the one or more processors, the location application being configured to:
store in the memory a listen list of one or more beacon universally unique identifiers (UUIDs) associated with the location application, the one or more beacon UUIDs corresponding to a first locale of the mobile device;
monitor wirelessly received UUIDs transmitted by one or more beacons;
perform an operation executable by the one or more processors upon detection of a beacon UUID stored in the listen list, the operation being associated with the detected beacon UUID and the location application;
detect a change in one or more monitored user contextual parameters satisfying one or more listen list update trigger conditions, the change in the one or more monitored user contextual parameters indicating movement of the mobile device to a second locale corresponding to a different set of one or more beacon UUIDs; and
update the listen list stored in the memory with the different set of one or more beacon UUIDs, responsive to satisfaction of the one or more listen list update trigger conditions.

19. The system of claim 18, wherein the location application is further configured to update the one or more listen list update trigger conditions.

20. The system of claim 18, wherein the location application is further configured to collect one or more additional user contextual parameters responsive to the detection of satisfaction of the one or more listen list update trigger conditions and wherein the different set of one or more beacon UUIDs is based at least on the collected one or more additional user contextual parameters.

* * * * *